G. BRAENDLE.
BOTTLE STOPPER.
APPLICATION FILED SEPT. 23, 1912.
1,053,353.
Patented Feb. 18, 1913.
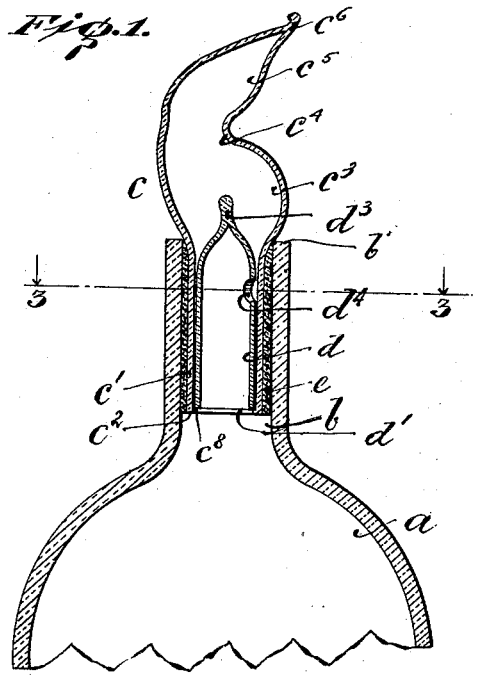
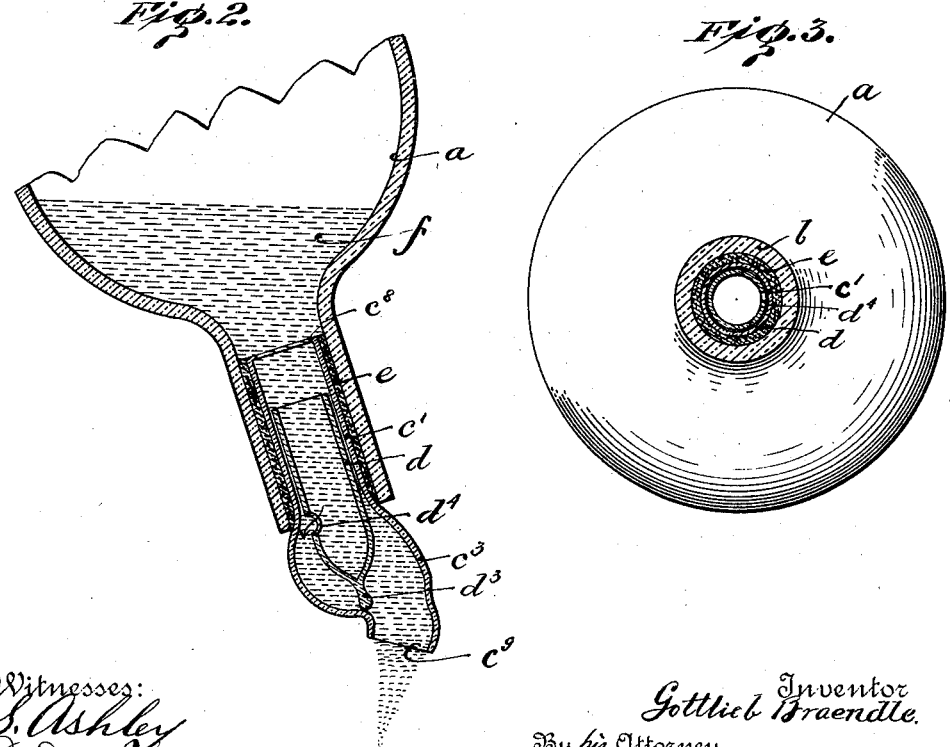
Witnesses:
C. S. Ashley
J. J. Donohue
Inventor
Gottlieb Braendle
By his Attorney
Max V. Ordmann
COLUMBIA PLANOGRAPH CO., WASHINGTON, D. C.

UNITED STATES PATENT OFFICE.

GOTTLIEB BRAENDLE, OF NEW YORK, N. Y.

BOTTLE-STOPPER.

1,053,353.  Specification of Letters Patent.  Patented Feb. 18, 1913.

Application filed September 23, 1912. Serial No. 721,956.

*To all whom it may concern:*

Be it known that I, GOTTLIEB BRAENDLE, citizen of the Republic of Switzerland, residing at New York, in the county of New York and State of New York, have invented certain new and useful Improvements in Bottle-Stoppers, of which the following is a specification.

The present invention relates to stoppers for bottles or like receptacles and has for its object to provide a stopper which will prevent the refilling of the receptacle.

Another object of my invention is to provide a stopper that will be inexpensive and of simple construction.

My invention is fully illustrated in the accompanying drawing in which similar reference characters denote corresponding parts and in which—

Figure 1 is a longitudinal section of the new stopper and a part of the receptacle in which the same is fixed, showing the receptacle in raised position and the stopper closed; Fig. 2 is a similar section, showing the receptacle tilted upside down and the stopper open and Fig. 3 is a cross section on line 3—3 of Fig. 1.

$a$ denotes a part of a liquid receptacle and $b$ the neck of said receptacle.

The new stopper $c$ is cast or blown of glass and has substantially the shape shown in Fig. 1. It consists of a hollow irregular body, which has a cylindrical or tubular portion $c'$, that is open at its free end $c^2$, a somewhat widened bowl shaped or inflated portion $c^3$ the upper part $c^4$ of which is contracted and extended into a gradually reducing portion $c^5$ which runs out into a point $c^6$ and is closed at its end. Snugly, but slidably, tilted in the cylindrical portion $c'$ of the body $c$ is a second cylindrical or tubular hollow body $d$ which is open at its lower end $d'$ and closed at its upper end $d^3$ and which in its circumference is provided with a recess or perforation $d^4$. This inner body $d$ serves as a valve and is so admeasured that when in normal or closed position, its lower open end $d'$ will be substantially flush with the lower end of the outer body $c$ and its upper pin shaped extension $d^3$ will be at some distance below the shoulder $c^4$ formed by the contraction $c^5$ and projecting across the path of the pin $d^3$ of the movable body $d$. When the receptacle $a$ is tilted to its up side down position (Fig. 2), the slidable body or valve $d$ slides outwardly until the pin or projection $d^3$ thereof rests against the shoulder $c^4$, when the perforation or recess $d^4$ emerges from within the cylindrical part $c'$ of the body $c$ and opens into the inflated portion $c^3$. To prevent the slipping out of the body or valve $d$ from the body $c$, the lower end $c^2$ of the latter is formed with a narrow inwardly projecting flange $c^8$, which may be made either by pressing against the said end while the body is still in a moldable state or while casting said body.

The body $c$ is adapted to be permanently and securedly fixed in the neck $b$ of the receptacle $a$ and to this end cement or other suitable material may be used. The cylindrical portion $c'$ of the stopper may be made of such a diameter that a sufficient space is left between it and the inner surface of the neck $b$ of the receptacle to receive the cementing material $e$. The bowl or inflated portion $c^3$ of the stopper will partly overlap the upper edge $b'$ and of the mouth of the neck $b$ and prevent access to the cement by any instrument to destroy the latter. If the neck of the bottle is so wide and long as to be able to receive all or a part of the inflated part $c^3$ of the stopper, the latter may be placed deeper down into the neck so that to reach the cement between the cylindrical part $c'$ of the stopper and the inner surface of the neck there will be no possibility at all.

It will be seen that when the stopper is fixed in the neck of the bottle as shown in Fig. 1 after the receptacle is filled with a liquid, the pouring out of the liquid will be impossible without breaking off the reduced end $c^5$, $c^6$ of the stopper (as shown in Fig 2). When the stopper is opened in this manner the liquid $f$ will flow off through the outwardly displaced opening $d^4$ and opening $c^9$. On the other hand, the refilling of the bottle will be rendered impossible owing to the sliding body or valve $d$ being caused by the pressure to return into closed position (shown in Fig. 1).

In order to prevent any instrument from being inserted through opening $c^9$ so as to catch and hold the body $d$ in open position to enable refilling, the reduced end $c^5$, $c^6$ may be intricately corrugated or otherwise shaped.

What I claim and desire to secure by Letters Patent is:

1. A stopper for liquid receptacles, consisting of a hollow irregularly shaped body, one end of which is open and the other end of which is closed, reduced and fragile, and a hollow valve snugly and slidably fitted in said body and having passages, whereby at a certain position of said slidable valve, communication is established between the latter and the said body.

2. A stopper for liquid receptacles, consisting of a hollow irregularly shaped body, one end of which is open and the other end of which is closed, reduced and fragile, and a hollow valve having a lateral passage and snugly and slidably fitted in said body and which is open at its outer end and closed at its inner end, whereby at a certain position of said valve communication is established between the latter and said body.

3. A stopper for liquid receptacles, consisting of a hollow body which has a lower cylindrical portion open at its free end, an intermediate inflated portion and an upper closed reduced and fragile end and a hollow cylindrical valve having a lateral passage and snugly and slidably fitted in said cylindrical portion and which is open at its outer end and closed at its inner end, whereby when the said valve body is displaced inwardly the said lateral passage opens into the inflated portion and establishes communication between said valve and the said body.

4. In a stopper, the combination with a liquid receptacle, of a hollow, irregularly shaped body permanently fixed in the neck of the said receptacle and the lower or inner end of which is open and the upper or outer end of which is closed, reduced and fragile, and a hollow valve having a lateral passage and snugly and slidably fitted in said hollow body and which at its lower or inner end is adapted to communicate with said receptacle and at its upper end is closed, whereby when the said slidable valve is displaced inwardly communication is established between said valve body and the said body.

5. A stopper for liquid receptacles, consisting of a hollow fragile body having a cylindrical lower portion, an intermediate inflated portion, a contraction forming an inwardly directed shoulder and an upper closed and reduced end portion, and a hollow valve having a lateral perforation, and snugly and slidably fitted in said cylindrical portion and which is open at its outer end and closed at its upper end, whereby when the said slidable valve is displaced inwardly, the latter opens into the inflated portion and communication is established between said outer body and said valve, the inward displacement of said valve being limited by the said contraction or shoulder.

6. A stopper for liquid receptacles, consisting of a hollow irregularly shaped body, one end of which is open and the other end of which is closed, reduced and fragile, a hollow valve snugly and slidably fitted in said body and having passages, whereby at a certain position of said slidable valve, communication is established between the latter and the said body, and means for preventing said valve from slipping out from said hollow body.

In testimony whereof I affix my signature in presence of two witnesses.

GOTTLIEB BRAENDLE.

Witnesses:
 LAWRENCE L. LEVY,
 MAX D. ORDMANN.

---

Copies of this patent may be obtained for five cents each, by addressing the "Commissioner of Patents, Washington, D. C."